(12) United States Patent
Venema et al.

(10) Patent No.: US 9,296,839 B2
(45) Date of Patent: Mar. 29, 2016

(54) MULTIFUNCTIONAL SUPERHYDROPHOBIC DIATOMACEOUS EARTH FOR CHEMICAL ADHESION AND COLOR CHANGE

(71) Applicant: UNITED PROTECTIVE TECHNOLOGIES, Locust, NC (US)

(72) Inventors: Peter Craig Venema, Locust, NC (US); Brent William Barbee, Stanfield, NC (US); Jordan Moriah Larson, Troy, NC (US)

(73) Assignee: VELOX FLOW, LLC, Locust, NC (US)

( * ) Notice: Subject to any disclaimer, the term of this patent is extended or adjusted under 35 U.S.C. 154(b) by 0 days.

(21) Appl. No.: 14/357,552

(22) PCT Filed: Nov. 11, 2012

(86) PCT No.: PCT/US2012/064581
§ 371 (c)(1),
(2) Date: May 9, 2014

(87) PCT Pub. No.: WO2013/071212
PCT Pub. Date: May 16, 2013

(65) Prior Publication Data
US 2014/0309343 A1    Oct. 16, 2014

Related U.S. Application Data

(60) Provisional application No. 61/558,861, filed on Nov. 11, 2011.

(51) Int. Cl.
| | | |
|---|---|---|
| *B32B 27/06* | (2006.01) | |
| *C08F 8/42* | (2006.01) | |
| *B01J 2/00* | (2006.01) | |
| *C09C 1/30* | (2006.01) | |
| *C08G 59/14* | (2006.01) | |
| *C08L 95/00* | (2006.01) | |

(52) U.S. Cl.
CPC ... *C08F 8/42* (2013.01); *B01J 2/00* (2013.01); *C08G 59/1477* (2013.01); *C08L 95/00* (2013.01); *C09C 1/3081* (2013.01); *C01P 2004/03* (2013.01)

(58) Field of Classification Search
CPC .......... C09C 1/3081; C08K 9/06; B05D 1/34; B05D 1/36; B05D 5/00
See application file for complete search history.

(56) References Cited

U.S. PATENT DOCUMENTS

| | | | |
|---|---|---|---|
| 5,498,475 A * | 3/1996 | Takigawa et al. | 428/334 |
| 6,068,911 A | 5/2000 | Shouji et al. | |
| 6,149,979 A * | 11/2000 | Kushibiki et al. | 427/387 |
| 6,420,456 B1 | 7/2002 | Koski | |
| 6,495,624 B1 | 12/2002 | Brown | |
| 6,506,496 B1 | 1/2003 | Frugier et al. | |
| 7,544,411 B2 | 6/2009 | Baumann | |
| 7,943,234 B2 | 5/2011 | Lawin et al. | |
| 8,187,707 B2 | 5/2012 | Van Benthem et al. | |
| 8,513,342 B2 | 8/2013 | Gao et al. | |
| 2006/0286305 A1 * | 12/2006 | Thies et al. | 427/508 |
| 2007/0298216 A1 * | 12/2007 | Jing et al. | 428/141 |
| 2008/0090004 A1 | 4/2008 | Zhang et al. | |
| 2008/0102262 A1 * | 5/2008 | Esaki et al. | 428/220 |
| 2008/0240479 A1 | 10/2008 | Linford et al. | |
| 2008/0285133 A1 * | 11/2008 | Yoneyama et al. | 359/580 |
| 2009/0202819 A1 * | 8/2009 | Asahi et al. | 428/336 |
| 2010/0092765 A1 | 4/2010 | Hager et al. | |
| 2010/0316953 A1 * | 12/2010 | Suwa et al. | 430/270.1 |
| 2011/0160374 A1 | 6/2011 | Jin | |
| 2011/0195181 A1 * | 8/2011 | Jin et al. | 427/213.32 |
| 2011/0250376 A1 | 10/2011 | Aria et al. | |
| 2014/0155522 A1 * | 6/2014 | Simpson et al. | 523/400 |
| 2014/0238263 A1 * | 8/2014 | Scheonfisch et al. | 106/2 |

FOREIGN PATENT DOCUMENTS

| | | |
|---|---|---|
| EP | 2 317 006 A1 | 5/2011 |
| WO | 02064266 A2 | 8/2002 |
| WO | 03062927 A1 | 7/2003 |
| WO | WO 2009/012116 A2 | 1/2009 |
| WO | 2012003004 A2 | 1/2012 |
| WO | 2013042052 A1 | 3/2013 |

OTHER PUBLICATIONS

International Search Report for corresponding PCT Application No. PCT/US2012/064581; mailed Mar. 27, 2013; 3 pages.
European Patent Office. European Patent Application No. 12847080.4-1355/2785640. European Office Action completed Jul. 23, 2015 and mailed Jul. 31, 2015. Name of Applicant: Velox Flow, LLC. English Language. 6 pages.

* cited by examiner

*Primary Examiner* — Margaret Moore
(74) *Attorney, Agent, or Firm* — Moore & Van Allen PLLC

(57) ABSTRACT

Provided herein is a multifunctional particle and methods of forming the same. The multifunctional particle includes: a silica particle; a hydrophobic silane; and a silane coupling agent; where each of the hydrophobic silane and the silane coupling agent are chemically bonded to the surface of the silica particle; where the multifunctional particle is superhydrophobic and chemically reactive.

9 Claims, 9 Drawing Sheets

MULTIFUNCTIONAL SUPERHYDROPHOBIC DIATOMACEOUS EARTH FOR CHEMICAL ADHESION AND COLOR CHANGE

CROSS-REFERENCE TO RELATED APPLICATIONS

This application is a U.S. 371 National Phase Patent Application of International Patent Application No. PCT/US2012/064581, entitled MULTIFUNCTIONAL SUPERHYDROPHOBIC DIATOMACEOUS EARTH FOR CHEMICAL ADHESION AND COLOR CHANGE, filed on Nov. 11, 2013, the entire contents of which is hereby incorporated by reference and from which, priority is claimed under 35 U.S.C. §1.120. As in the parent International Patent Application No. PCT/US2012/064581, this application also claims the benefit of U.S. Provisional Application No. 61/588,861, filed on Nov. 11, 2011, the entire contents of which is also hereby incorporated by reference and from which, priority is claimed under 35 U.S.C. §119(e).

BACKGROUND

Diatomaceous earth nanoparticles (DE) may be functionalized with fluorocarbons or saturated hydrocarbons to become superhydrophobic, but are incapable of chemically bonding to anything due to the highly unreactive self-assembled monolayer (SAM) of the fluorocarbons or saturated hydrocarbons. Current coating technologies generally incorporate fluorinated diatomaceous earth (FDE) into polymer solutions. The particles are held in by mechanical forces and can easily be rubbed out of the surface. The polymer surface typically is highly porous and very rough.

BRIEF SUMMARY

In one embodiment, a multifunctional particle is provided. The multifunctional particle comprising: a silica particle; a hydrophobic silane; and a silane coupling agent; wherein each of the hydrophobic silane and the silane coupling agent are chemically bonded to the surface of the silica particle; wherein the multifunctional particle is superhydrophobic and chemically reactive.

In a first aspect of the first embodiment, the silica particle comprises a diatomaceous earth particle, a fused silica particle, or a rice husk ash particle.

In a second aspect, alone or in combination with the first aspect of the first embodiment, the hydrophobic silane and the silane coupling agent are simultaneously bonded to the surface of the silica particle.

In a fourth aspect, alone or in combination with any of the previous aspects of the first embodiment, the hydrophobic silane bonds to the surface of the silica particle before the silane coupling agent bonds to the surface of the silica particle.

In a fifth aspect, alone or in combination with any of the previous aspects of the first embodiment, the silane coupling agent bonds to the surface of the silica particle before the hydrophobic silane bonds to the surface of the silica particle.

In a sixth aspect, alone or in combination with any of the previous aspects of the first embodiment, the silane coupling agent is selected from the group consisting of amino-functional hydrocarbon silanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyl-trimethoxysilane, methyacryloxypropyl-trimethoxysilane, and combinations thereof.

In a seventh aspect, alone or in combination with any of the previous aspects of the first embodiment, the silane coupling agent comprises amine silanes, olefin silanes, anhydride silanes, epoxy silanes, halogen silanes, hydroxyl silanes, dipodal silanes, acrylate silanes, sulfur-containing silanes, water based silanes, isocyanate silanes, or azide silanes.

In an eighth aspect, alone or in combination with any of the previous aspects of the first embodiment, the hydrophobic silane comprises a molecule of the structure:

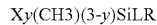

where y is 1 to 3;
X is Cl, Br, I, H, HO, R'HN, R'2N, imidizolo, R'C(O)N(H), R'C(O)N(R"), R'O, F3CC(O)N(H), F3CC(O)N(CH3), or F3S(O)2O, where R' is a straight or branched chain hydrocarbon of 1 to 4 carbons and R" is methyl or ethyl;
L, a linking group, is CH2CH2, CH2CH2CH2, CH2CH2O, CH2CH2CH2O, CH2CH2C(O), CH2CH2CH2C(O), CH2CH2OCH2, CH2CH2CH2OCH2; and
R is (CF2)nCF3 or (CF(CF3)OCF2)nCF2CF3, where n is 0 to 24.

In a ninth aspect, alone or in combination with any of the previous aspects of the first embodiment, the hydrophobic silane comprises 1H,1H,2H,2H-perfluorooctyltrichlorosilane In another embodiment, a method for producing a multifunctional particle is provided. The method comprising: providing a silica particle; contacting a hydrophobic silane to the surface of the silica particle to chemically bond the hydrophobic silane to the surface of the silica particle; contacting a silane coupling agent to the surface of the silica particle to chemically bond the silane coupling agent to the surface of the silica particle; wherein the multifunctional particle is superhydrophobic and chemically reactive.

In a first aspect of the second embodiment, the silica particle comprises a diatomaceous earth particle, a fused silica particle, or a rice husk ash particle.

In a second aspect, alone or in combination with the first aspect of the second embodiment, the hydrophobic silane and the silane coupling agent are simultaneously bonded to the surface of the silica particle.

In a third aspect, alone or in combination with any of the previous aspects of the second embodiment, the hydrophobic silane bonds to the surface of the silica particle before the silane coupling agent bonds to the surface of the silica particle.

In a fourth aspect, alone or in combination with any of the previous aspects of the second embodiment, the silane coupling agent bonds to the surface of the silica particle before the hydrophobic silane bonds to the surface of the silica particle.

In a fifth aspect, alone or in combination with any of the previous aspects of the second embodiment, the silane coupling agent is selected from the group consisting of amino-functional hydrocarbon silanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyl-trimethoxysilane, methyacryloxypropyl-trimethoxysilane, and combinations thereof.

In a sixth aspect, alone or in combination with any of the previous aspects of the second embodiment, the silane coupling agent comprises amine silanes, olefin silanes, anhydride silanes, epoxy silanes, halogen silanes, hydroxyl silanes, dipodal silanes, acrylate silanes, sulfur-containing silanes, water based silanes, isocyanate silanes, or azide silanes.

In a seventh aspect, alone or in combination with any of the previous aspects of the second embodiment, the hydrophobic silane comprises a molecule of the structure:

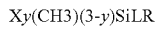

where y is 1 to 3;
X is Cl, Br, I, H, HO, R'HN, R'2N, imidizolo, R'C(O)N(H), R'C(O)N(R"), R'O,
F3CC(O)N(H), F3CC(O)N(CH3), or F3S(O)2O, where R' is a straight or branched chain hydrocarbon of 1 to 4 carbons and R" is methyl or ethyl;
L, a linking group, is CH2CH2, CH2CH2CH2, CH2CH2O, CH2CH2CH2O, CH2CH2C(O), CH2CH2CH2C(O), CH2CH2OCH2, CH2CH2CH2OCH2; and
R is (CF2)nCF3 or (CF(CF3)OCF2)nCF2CF3, where n is 0 to 24.

In an eighth aspect, alone or in combination with any of the previous aspects of the second embodiment, the method further includes rinsing the silica particle with a solvent to remove impurities.

In a ninth aspect, alone or in combination with any of the previous aspects of the second embodiment, the method further includes rinsing the silica particle with a solvent to expose SiOH groups on the silica particle; wherein the silane coupling agent reacts with at least one SiOH group.

In a tenth aspect, alone or in combination with any of the previous aspects of the second embodiment, the multifunctional particle comprises a self-assembled monolayer.

In still another embodiment, a multifunctional composition is provided. The composition comprising: multifunctional particles, wherein each multifunctional particle comprises: a silica particle; a hydrophobic silane; and a silane coupling agent; wherein each of the hydrophobic silane and the silane coupling agent are chemically bonded to the surface of the silica particle; wherein the multifunctional particle is superhydrophobic and chemically reactive.

In a first aspect of the third embodiment, the composition further includes a binder solution for suspending the multifunctional particles.

In a second aspect, alone or in combination with the first aspect of the third embodiment, the composition further includes a polymer selected from the group consisting of thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, and combinations thereof.

In a third aspect, alone or in combination with any of the previous aspects of the third embodiment, the polymer is copolymerized with the multifunctional particles.

In a further embodiment, a method for forming superhydrophobic surfaces is provided. The method comprising: providing a plurality of multifunctional particles, each multifunctional particle comprising: a silica particle; a hydrophobic silane; and a silane coupling agent; wherein each of the hydrophobic silane and the silane coupling agent are chemically bonded to the surface of the silica particle; wherein the multifunctional particle is superhydrophobic and chemically reactive; and introducing the multifunctional particles to the surface of the substrate to form a superhydrophobic surface.

In a first aspect of the fourth embodiment, the introducing the multifunctional particles to the surface of a substrate to form a superhydrophobic surface comprises: applying the multifunctional particles to the surface of the substrate.

In a second aspect, alone or in combination with the first aspect of the fourth embodiment, the method further comprises forming a suspension of the multifunctional particles in a binder solution In a third aspect, alone or in combination with any of the previous aspects of the fourth embodiment, the introducing the multifunctional particles to the surface of a substrate to form a superhydrophobic surface comprises: mixing the multifunctional particles and a material.

In a fourth aspect, alone or in combination with any of the previous aspects of the fourth embodiment, the method further comprises forming the substrate from the mixture.

In a fifth aspect, alone or in combination with any of the previous aspects of the fourth embodiment, the method further comprises applying the mixture to the substrate surface; and heating the substrate to cure the mixture.

In a sixth aspect, alone or in combination with any of the previous aspects of the fourth embodiment, the material comprises asphalt or a polymer, wherein the polymer comprises thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, or combinations thereof.

In a seventh aspect, alone or in combination with any of the previous aspects of the fourth embodiment, the multifunctional particles are covalently bonded to the substrate surface.

In a eighth aspect, alone or in combination with any of the previous aspects of the fourth embodiment, the substrate has insulating properties and corrosion resistant properties.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1:
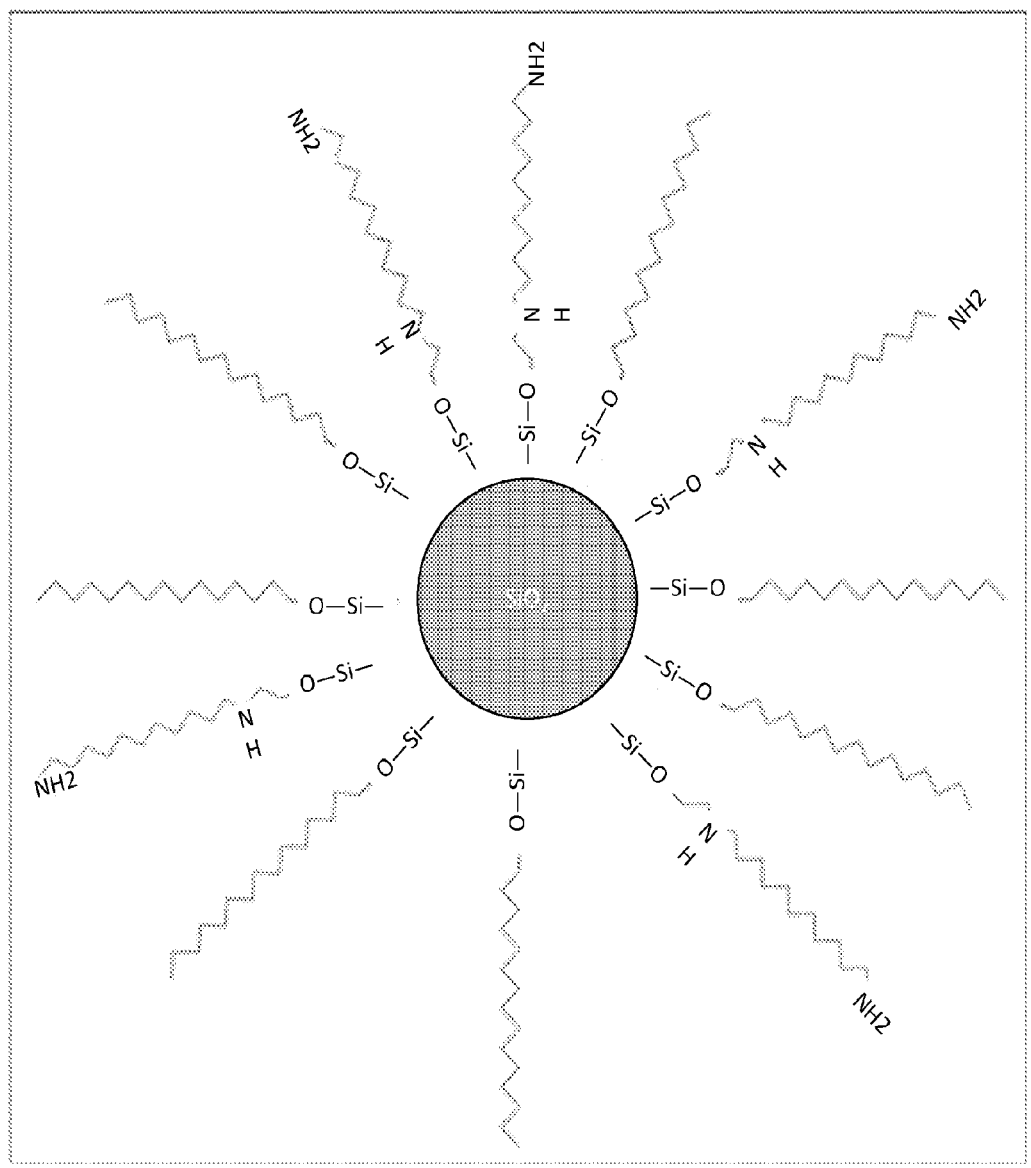
FIG. 1 illustrates a multifunctional particle in accordance with various embodiments of the disclosure.

The embodiments of the disclosure presented herein are directed to multifunctional silica ($SiO_2$) particles that are superhydrophobic and chemically reactive. This multifunctional particle maintains superhydrophobicity but has surface groups available for chemical reactivity. Silica particles can be surface treated to increase hydrophobicity and create superhydrophobic particles having a single functionality. Bonding applications of such singly function particles, however, are purely mechanical since the hydrophobic treatment is chemically inert. In some embodiments, another silane can be used in a secondary treatment of the particle surface to attach a compound for chemical reactivity. This leads to the creation of a multifunctional superhydrophobic nanoparticle which has the ability to chemically bond to a binding agent and retain superhydrophobic properties. This has been demonstrated through reaction-based color change of multifunctional particles that maintain their superhydrophobicity. In further embodiments, the hydrophobic silane and silane coupling agent are bonded to the surface of the silica particle and form a continuous, functional SAM (self-assembled monolayer) over the surface of the silica particle.

Multifunctional Particle

In some embodiments, the multifunctional particle comprises a silica particle, a hydrophobic silane chemically bonded to the surface of the silica particle, and a silane coupling agent chemically bonded to the surface of the of silica particle, where the multifunctional particle is superhydrophobic and chemically reactive. Hydrophobic surfaces bind very weakly with water, which makes drops of water form beads on the surface. A hydrophobic surface is generally defined and is defined herein as that which has a contact angle greater than 90° with a drop of water. A super-hydrophobic surface is defined herein as that which has a contact angle greater than 150° with a drop of water at normal ambient temperatures (about 25° C.). Further, for example, the multifunctional particle enhances adhesion of the silica particle to various materials. The multifunctional particle is capable of forming durable bonds, such as covalent bonds, between organic and inorganic materials. The multifunctional particle is further capable of reacting with a substrate and presenting the maximum number of sites with reactivity specific and accessible to the matrix phase. Although the multifunctional particles are described in terms of superhdydrophobicity and chemical reactivity, it will be understood that any number of other properties or functionalities may also be attributable to the multifunctional particles. For example, other functionalities may include corrosion resistance, insulation, and the like.

The silica particle includes $SiO_2$ containing compounds. Exemplary silica particles include diatomaceous earth particles, fused silica, rice husk ash particles, and the like. In some embodiments, the silica particles comprise nanoparticles. Diatomaceous earth is a chalk-like, soft, friable, earthy, very fine-grained, siliceous sedimentary rock usually light in color, although white when pure. It is very finely porous and is very low in density, such that it floats on water until its surface is wetted, and is chemically inert to most liquids and gases. It also displays low thermal conductivity and a high fusion point. Many sediments and sedimentary rocks are somewhat diatomaceous. The deposits result from an accumulation in oceans or fresh waters of the amorphous silica (opal, $SiO_2nH_2O$) cell walls of dead diatoms that are microscopic single-cell aquatic plants (algae). The fossilized skeletal remains—a pair of symmetrical shells (frustules)—vary in size from less than 1 micron to more than 1 millimeter but are typically 10 to 200 microns across. The frustules have a broad variety of delicate, lacy, perforated shapes from discs and balls to ladders, feathers, and needles, which provide the partitioned surface of the DE that provides the surface topography conducive to the achievement of superhydrophobic properties of the embodiments disclosed herein when the surface is properly treated in a manner that retains the surface topography but renders the surface hydrophobic. The typical chemical composition of diatomaceous earth is about 86% silica, 5% sodium, 3% magnesium and 2% iron.

DE is generally processed into two different products: natural-grade (or uncalcined) and calcined. The processing of natural-grade diatomite consists of crushing and drying. Crude diatomite commonly contains up to 40 percent moisture and can include more that 60 percent water. Typically a primary crushing is carried out to the material as mined to yield a desired aggregate size. The crushed DE is subsequently milled and dried simultaneously where suspended particles of diatomite are carried in a stream of hot gases. Flash and rotary dryers are used to dry the material to a powder of approximately 15 percent moisture. Typical flash dryer operating temperatures range from 70 to 430° C. The suspended particles exiting the dryer pass through a series of fans, cyclones, and separators. These sequential operations separate the powder into various sizes, remove waste impurities, and expel the absorbed water. These natural-milled diatomite products are then bagged or handled in bulk without additional processing. Natural-grade DE is preferred for the practice of the invention.

For filtration uses, natural grade diatomite is calcined by heat treatment in gas- or fuel oil-fired rotary calciners, with or without a fluxing agent. Straight calcining is used for adjusting the particle size distribution for use as a medium flow rate filter aid. The product of straight calcining has a pink color from the oxidation of iron in the raw material, which is more intense with increasing iron oxide content of the DE. Typical calciner operating temperatures range from 650 to 1,200° C. For straight-calcined grades, the powder is heated in large rotary calciners to the point of incipient fusion, and thus, in the strict technical sense, the process is one of sintering rather than calcining.

DE treated in excess of 650° C. undergoes material and structural changes which is deleterious to the silicate surface functionality to which the hydrophobic coating of the present invention is ultimately bound and at slightly higher temperatures is deleterious to the highly partitioned surface topography that enables superhydrophobic character when coated with a hydrophobic material. The surface of uncalcined DE is that of amorphous silica, more similar in composition to that of precipitated silica rather than pyrogenic silica. There is a reasonably high silanol content to the DE surface that can be characterized as having strong hydrogen bonded silanols, moderate strength hydrogen bonded silanols and weak hydrogen bonded silanols. Upon warming nearly all strongly hydrogen bonded silanols are lost when 650° C. is reached, moderate strength hydrogen bonded silanols are lost when 1,000° C. is achieved and above 1,000° C. the weak hydrogen bonded silanols are lost. For the practice of the invention it is desirable that although surface bound water is reduced to a low level or completely removed, the presence of at least some moderate strength hydrogen bonded silanols is intended to provide sufficient sites for bonding of the coating layer and thereby stabilizing the hydrophobic self-assembly monolayer coating. For this reason calcined DE is generally avoided for the practice of the invention as most calcined DE has been treated in excess of 800° C. The desired surface topography formed by the diatoms and a sufficient amount of silanol functionality on the silicate surface to achieve the continuous SAM of the present invention is generally unavailable with DE that is heat treated in excess of 800° C.

Exemplary hydrophobic silanes include a molecule of the structure:

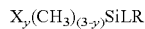

where y is 1 to 3; X is Cl, Br, I, H, HO, R'HN, R'$_2$N, imidizolo, R'C(O)N(H), R'C(O)N(R"), R'O, F$_3$CC(O)N(H), F$_3$CC(O)N (CH$_3$), or F$_3$S(O)$_2$O, where R' is a straight or branched chain hydrocarbon of 1 to 4 carbons and R" is methyl or ethyl; L, a linking group, is CH$_2$CH$_2$, CH$_2$CH$_2$CH$_2$, CH$_2$CH$_2$O, CH$_2$CH$_2$CH$_2$O, CH$_2$CH$_2$C(O), CH$_2$CH$_2$CH$_2$C(O), CH$_2$CH$_2$OCH$_2$, CH$_2$CH$_2$CH$_2$OCH$_2$; and R is (CF$_2$)$_n$CF$_3$ or (CF(CF$_3$)OCF$_2$)$_n$CF$_2$CF$_3$, where n is 0 to 24. Exemplary hydrophobic silanes include fluoralkylsilanes (e.g., 1H,1H, 2H,2Hperfluorooctyltrimethoxysilane) and alkylsilanes (e.g., octadecyltrichlorosilane).

Exemplary silane coupling agents include amine silanes, olefin silanes, anhydride silanes, epoxy silanes, halogen silanes, hydroxyl silanes, dipodal silanes, acrylate silanes, sulfur-containing silanes, water based silanes, isocyanate silanes, azide silanes, and/or combinations thereof. Exemplary amine silanes include: n-(2-aminoethyl)-3-aminopropyltrimethoxysilane, 3-aminopropyltriethoxysilane, 3-aminopropyltrimethoxysilane, n,n'-bis[3-(triethoxysilyl) propyl] urea, ureidopropyltrimethoxysilane, 3-aminopropylmethyldiethoxysilane, n,n'-bis[(3-trimethoxysilyl)propyl]ethylenediamine, n1-(3-trimethoxysilylpropyl)diethylenetriamine, m-aminophenyltrimethoxysilane, n-(3-triethoxysilylpropyl)-4,5-dihydroimidazole, n-methylaminopropyltrimethoxysilane, 3-aminopropyltris(methoxyethoxyethoxy)silane, ureidopropyltriethoxysilane, n-(2-aminoethyl)-3-aminopropylmethyldimethoxysilane, and/or combinations thereof. Exemplary olefin silanes include: styrylethyltrimethoxysilane, methacryloxypropyl-trimethoxysilane, vinyltriethoxysilane, triethoxysilyl modified poly-1,2-butadiene, vinylethoxysiloxane homopolymer, vinyltriacetoxysilane, vinylmethoxysiloxane homopolymer, allyltrimethoxysilane, vinyltriisopropoxysilane, and combinations thereof. Exemplary anhydride silanes include (3-triethoxysilyl)propylsuccinic anhydride. Exemplary epoxy silanes include 2-(3,4-epoxycyclohexyl)ethyltrimethoxysilane, (3-glycidoxy-propyl)trimethoxysilane, and combinations thereof. Exemplary halogen silanes include: ((chloromethyl)phenylethyl)trimethoxysilane, p-chloromethyl) phenyltrimethoxysilane, and combinations thereof. Exemplary hydroxyl silanes include n,n-bis(2-hydroxyethyl)-3-aminopropyltriethoxysilane. Exemplary dipodal silanes include: bis(3-trimethoxy-silylpropyl)amine, tris(3-trimethoxysilyl propyl)isocyanurate, 1,6-bis(trimethoxysilyl)hexane, vinylmethoxysiloxane homopolymer, n,n'-bis [(3-trimethoxysilyl)propyl]ethylenediamine, trimethoxysilylpropyl modified (polyethylenimine), bis(trimethoxysilylethyl)benzene, 1,8-bis(triethoxysilyl)octane, and combinations thereof. Exemplary acrylate silanes include: (3-acryloxypropyl)trimethoxysilane, methacryloxypropyl-trimethoxysilane, and combinations thereof. Exemplary isocyanate silanes includes 3-isocyanatopropyltriethoxysilane and the like.

Exemplary sulfur silanes include: 3-mercaptopropyltrimethoxysilane, 3-mercaptopropyl-methyldimethoxysilane, bis[3-(triethoxysilyl)propyl]tetrasulfide, 3-methacryloxypropyl-bis(trimethylsiloxy)methylsilane, and combinations thereof. Exemplary waterborne silanes include: aminopropylsilsesquioxane in aqueous solution, aminoethylaminopropylsilsesquioxane in aqueous solution, and the like. Exemplary azide silanes include 6-azidosulfonylhexyltriethoxysilane and the like.

In some embodiments, the hydrophobic silane is chemically bonded to the surface of the silica particle before the silane coupling agent is chemically bonded to the surface of the silica particle.

The hydrophobic silane, in some embodiments, is covalently bonded to the surface of the silica particle. The surface functionalization of the silica particle can be carried out with the neat hydrophobic silane, or the precursor in a non-reactive solvent such as a hydrocarbon, an ether, or a fluorinated solvent. In some cases, the silica particle can have the hydrophobic silane deposited on the silica particle surface from the vapor phase. The surface functionalization can be carried out with an added non-nucleophilic proton acceptor such as a tertiary amine, for example triethylamine or pyridine, to scavenge acidic byproducts of the reaction. A catalyst can be included to accelerate the formation of the SAM. Water can also be included in the formulation. The amount of added water will depend upon the amount of residual water on the pretreated silica particle and the nature of the hydrophobic silane used. Water can be introduced as a liquid or a vapor. In many cases, water vapor from ambient air is sufficient to react with the hydrophobic silane to interconnect the hydrophobic silane into the structured stable SAM coating. The time and temperature needed for effective formation of the SAM coating will depend upon the structure of the hydrophobic silane and any solvent, scavenger, or catalyst used. With many of the hydrophobic silanes the treatment can be carried out rapidly at normal room temperatures. In some embodiments, temperatures of about 0 to about 100° C. or more can be used. Reaction times can vary from as little as about 2 minutes to about 24 hours depending on the hydrophobic silane and conditions used for the SAM formation. In general, any excess hydrophobic silane and by-products formed during deposition and bonding can be readily removed from the surface by washing or in some cases by applying a vacuum and/or heat.

The resulting silica particles, which are functionalized with the hydrophobic silane, can be dried before the silane coupling agent is bonded to the single silane functionalized silica particles. In some embodiments, the single silane functionalized silica particles are rinsed to remove impurities. For example, if a chlorine-containing silane was used to functionalize the silica particles, then a rinsing procedure can be used to remove the chlorine groups. This is accomplished by taking single silane functionalized silica particles and rinsing it in hexane, then filtering and drying the particles to remove residual chlorine groups on the surface. These clean particles are then immersed in hexane and mixed with the silane coupling agent and water. This allows for the silane coupling agent to bond to open Si—OH groups on the particle. These available bond sites are due to incomplete functionalization of the particle due to steric effects or short reaction times.

In other embodiments, the silane coupling agent is chemically bonded to the surface of the silica particle before the hydrophobic silane is chemically bonded to the surface of the silica particle. The silane coupling agent includes hydrolysable groups such as an alkoxy, acyloxy, halogen, or amine, which form reactive SiOH groups upon hydrolysis. Siloxane linkages are formed when the reactive SiOH groups of the silane coupling agent condense with the SiOH groups on the surface of the silica particles. The resulting silica particles, which are functionalized with the silane coupling agent, can be dried before the hydrophobic silane is bonded to the single silane functionalized silica particles.

In additional or alternative embodiments, the hydrophobic silane and the silane coupling agent are simultaneously chemically bonded to the surface of the silica particle. For example, hydrophobic silanes such as fluorosilanes that have a (m) ethoxy head group termination can be mixed with similarly terminated silane coupling agents such that both compounds simultaneously bond to the particle. Methoxy and ethoxy silanes can be intermixed for reaction times, such that the methoxy compound will bond before the ethoxy compound. For example, 6-aminohexyl-3-aminopropyltrimethoxysilane (coupling agent) and 1H,1H,2H,2Hperfluorooctyltrimethoxysilane (hydrophobic silane) can be simultaneously mixed with water and hexane to deposit a multifunctional SAM onto silica particles. In this way, trichlorosilanes, which produce chlorine that reacts with the silane coupling agents, can be avoided. In some embodiments, aminopropylsilanes are used to treat fluorinated diatomaceous earth particles (FDE) to create fluoro-amino-diatomaceous earth.

In further embodiments, the multifunctional particle comprises a predetermined ratio of the hydrophobic silane and the silane coupling agent. The ratio of the silanes, in some embodiments, is based on the application of the multifunctional particles, the composition formulation of the multifunctional particles, targeted properties, the type of silane coupling agent, the type of hydrophobic silane, and the like. The ratio of hydrophobic silane to silane coupling agent is discussed in further detail below.

Referring now to FIG. 1, an exemplary multifunctional nanoparticle with long hydrocarbon chains for superhydrophobicity and amino-functional chains for binding to polymers is illustrated. Not shown are interlinking of silane head groups (—O—Si—O—Si—O—) on the nanoparticle surface. The hydrocarbon chains are shown for simplicity but are interchangeable for fluorocarbon chains.

Figure 2:
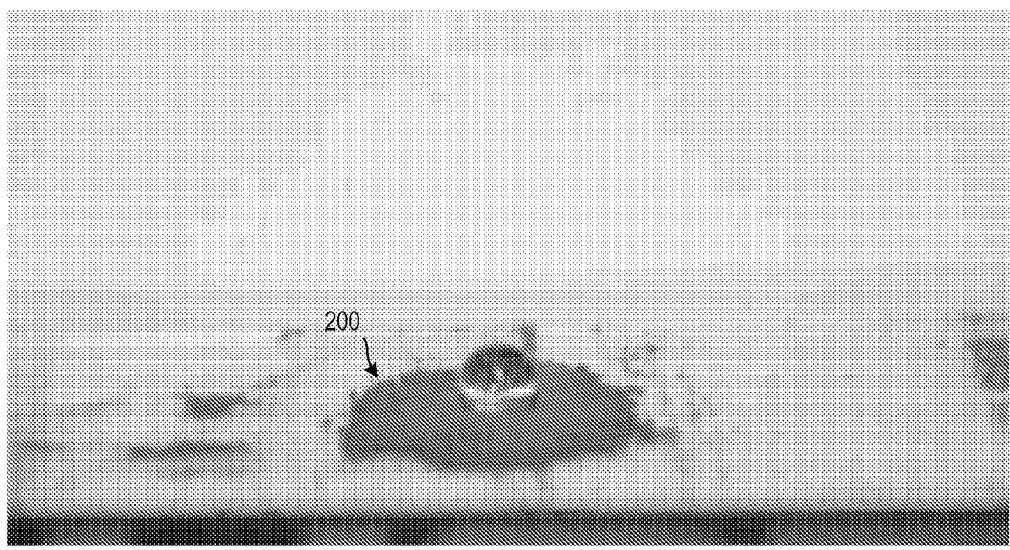
FIG. 2 illustrates functionalized diatomaceous earth particles treated with ninhydrin in accordance with various embodiments.

To demonstrate that the multifunctional particles are chemically reactive, in some embodiments, a chemical indicator can be used to change the color of the particles. These chemical groups of the multifunctional particle can also be tuned to certain colors by the use of adhesive pigments or by chemical reaction. Ninhydrin can be used for turning treated materials purple. For example, FIG. 2 shows multifunctional particles 200 treated with ninhydrin that have turned purple as a result of the treatment. Non-multifunctional superhydrophobic materials are colored by either fluorinating pigment particles or modifying the particle spacing or orientation in order to take advantage of surface optical properties to produce a color by light refraction and interference.

Compositions

Silica particles can be singly functionalized with one chemical to give hydrophobic surface functionality to the particle. This functionalization, combined with nanoscale surface roughness, leads to a superhydrophobic material. Mechanical durability of such surfaces, however, is generally extremely low and thus unusable in real world applications as particles have no surface chemistry to bond to and are generally pinned to the surface mechanically. Polymers generally polymerize around the particles and form voids surrounding them, allowing for mechanically pinning, but this also creates voids and fractures in the material due to the presence of non-polar particles which cannot meld with the polymer. This results in mechanical brushing or high energy water impacts that can easily remove the particles, allowing the surface to wet.

Addition of silane coupling agents to the nanoparticles allows for strong covalent bonds to chemically bind the nanoparticle to a surface or allow for copolymerization of the particles into polymer chains. These coupling agents can be selected to specifically bind to any number of materials in any given situation, allowing for customizable nanoparticles.

In some embodiments, a composition comprising the multifunctional particle is provided. In further embodiments, the composition further includes a binder solution for dispersing the multifunctional particles, solvents, water, processing aids, fillers, color agents, biocides, polymers, asphalt, and/or other materials. Exemplary polymers include thermosets, acrylates, methacrylates, polyesters, urethanes, epoxies, phenolics, thermoplastics, polydienes, polyvinyl chloride, polyphenylene sulfide, acrylics, maleic anhydride, vinyl acetate, diene-containing copolymers, halogen-modified homopolymers, chlorosulfonyl-modified homopolymers, polyamides, polyesters, polycarbonates, polysulfones, olefins, and combinations thereof. In some embodiments, the polymers are copolymerized with the multifunctional particles. For example, the presence of a polymer-compatible SAM allows for multifunctional particles to copolymerize with pre-polymers, such as PVC, urethane, epoxies, and thermoresins, which will react with the reactive groups of the silane coupling agent. In other embodiments, the silane coupling agent is matched to the targeted polymer. For example, silane coupling agents with amine groups may be better suited to react or bind to fluorocarbons and styrene butadienes and less suited to bind to nitrile and isoprene. In some exemplary embodiments, the composition includes N-(2-Aminoethyl)-3-aminopropyltrimethoxysilane or another silane coupling agent and epoxies, phenolics, melamines, nylons, PVC acrylics, urethanes, nitrile rubbers, thermoset polymers such as dialyphthalate, epoxy imide, melamine, paraffin, phenolic, polyester, urethane, cellulosics, polyacetal, polyamide, polybutylene terephthalate, and polycarbonates, as well as sealants such as polysulfides.

In some cases, when FADE (fluorocarbon/amino dual functional diatomaceous earth) is mixed with a pre-polymer, the resulting material is vastly different than the same mixture having FDE (singly functional fluorinated diatomaceous earth) instead of FADE. For example, mixing FDE and PVC (polyvinylchloride) cement results in a delicate superhydrophobic surface (e.g., not durable, easily broken), but mixing FADE with PVC cement results in a mechanically durable material that has very high hydrophobicity because the FADE particles have bonded directly to polymer chains. Additionally, mixing FDE with a silicone thermoresin and heat treating results in a very rough and delicate superhydrophobic material, while using FADE will result in a smooth and robust material that is very hydrophobic.

Additionally, particles can be treated in a "lock-key" fashion in which one set of multifunctional particles can be treated with one side of an adhesive compound, and another set of multifunctional particles can be treated with the other side of the adhesive compound similar to a two-part epoxy adhesive compounds. For example, an epoxy-type of diatomaceous earth package could be formulated in which particles A have an expoxidesilane (epoxy) and particles B can have aminosilane (hardener compound). Combining these particles in such a fashion to facilitate a reaction that results in the particles being crosslinked to one another, and the presence of free fluorocarbon chains also gives the epoxy superhydrophobicity. Exemplary silane coupling agents for use is these epoxy systems include aminosilanes and acrylicsilanes. Mixtures of these compounds form a hard resin material upon heating, which results in particles continuously embedded in a surface, having high mechanical durability to brushing or high energy water impacts.

Also provided herein are methods for forming superhydrophobic surfaces. In some embodiments, the multifunctional particles or a composition comprising the multifunctional particles are introduced to a surface of a substrate. In some exemplary embodiments, the multifunctional particles are applied to the surface of the substrate. For example, a coating comprising the multifunctional particles may be sprayed, brushed, or rolled on the substrate surface, or the substrate may be dipped into the coating. In further embodiments, the multifunctional particles are covalently bonded to the surface of the substrate. In other exemplary embodiments, the multifunctional particles may be mixed with polymer or other material and a substrate may be formed from the polymer. The multifunctional particles are dispersed in the substrate such that the substrate has a superhydrophobic surface. The substrate having a superhydrophobic surface may be formed from the mixture by extrusion, molds, heat curing, heating, air drying, and the like.

EXAMPLES

Preparation of Compositions Comprising Singly Functional Silica Particles

A) Polyvinylchloride (PVC) Cement Experiment
Combine in a glass beaker:
10.5 g methyl ethyl ketone (MEK)
1.0 g PVC cement
0.1 g 1H,1H,2H,2H-perfluorooctyltrichlorosilane (Rf—Si)
0.5 g FDE (fluorinated diatomaceous earth)
Blend the above mixture for at least 1 minute. Spray onto substrate using a PREVAL® Spray Gun. The mixture results in a surface that is superhydrophobic after drying, but that has low durability. Particles are mechanically pinned to the coating and abrasion can dislodge them. Optionally, spray with a PDMS/Toluene mixture for an oleophobic coating.
B) Aramid Fiber Experiment
Combine:
50 g Acetone
5 g FDE
0.5 g FAS (Fluorocarbon Silane)
Blend the above mixture for 30 seconds, and then pour solution over each side of KEVLAR® (aramid fiber) sample. Resulted in a superhydrophobic surface, but the particles did not stick to the surface of the KEVLAR® sample.
Preparation of Multifunctional Particles:
A) Bonding Silane Coupling Agent Before Bonding Hydrophobic Silane
i) Formulation A
Combined in glass beaker
12.2 g DE
0.5 g APS (aminopropyltrimethoxysilane)
24.8 g EtOH (ethanol)
Blend the above mixture for 15 minutes. Add 34 g of EtOH to rinse the sides of the glass beaker. Pour EtOH out, leaving 64.6 g total solution. Dip borosilicate slide into the solution, leave immersed in the solution for 1 minute. Spray solution on mesh, plastic, and additional borosilicate slide. Dry coated samples in direct sunlight. Some of the material stuck very well to the glass slide. Adhesion was judged by light finger abrasion. The glass slides from the above experiment had a hard film that was scratch resistant. The solution that was poured into a glass dish had dried out and formed a cake. These cakes were much sturdier than the cakes that result from drying out fluorinated DE. Mix for 1 minute:
0.6 g Rf—Si
68 g Xylol
Immerse coated glass slide for 1 minute in the above solution. Dry samples overnight in ambient conditions. Mix the remaining aminofunctional DE with Xylol/Rf—Si solution. Dip one glass slide in solution; leave in glass dish overnight. After drying, the amine-functional particles in the glass dish were found to be superhydrophobic. Coated glass slide also showed hydrophobicity.
ii) Formulation B
Combine in a container and blend for several minutes:
100 g Hexane
7 g Diatomaceous Earth
1 g methacryloxypropyltrimethoxysilane
2 mL H2O
It was noted that the reaction was gaseous. The resulting functionalized particles were filtered off with coffee filters, and then rinsed by decanting with hexane. The filtered particles were then heated at 150 F to dry out the particles.
B) Bonding Hydrophobic Silane Before Bonding Silane Coupling Agent
i) Formulation A
Rinse particles by blending:
5.0 g FDE
37.1 g Hexane, then decant hexane.
Start with about 32 g of Clean FDE in Hexane:
Add 14.0 g Hexane
Add 1.0 g APTES [(N-(2-aminoethyl)-3-aminopropyltrimethoxysilane)]
Blend solution, allow to air dry.
The APTES to DE weight ratio was determined as follows:
The wetting surface (ws) of APTES=355 m2/g.
Assume the following DE surface area (milled): typical: 10-30 m2/g; DiaSource: 69.05 m2/g; Perma-Guard: 26-28 m2/g; milling estimate: 50-60 m2/g.
Calculate the weight ratio to be ⅐th to ⅙th g APTES per g DE.
ii) Formulation B
Rising Step:
Combined in a container:
178.2 g FDE
Rinse 1: 217.5 g Hexane
Rinse 2: 242.6 g Hexane Mix the FDE and the 217.5 g of hexane for 5 minutes with blender. Keep mixture container sealed and allow the FDE to settle. Decant the hexane, and then repeat the above step for Rinse 2. After two rinses, 174.3 g of clean powder resulted.

Batch 1: Combine and blend after every addition:
30.0 g clean FDE (from the rinsing step above)
Add 46.5 g Hexane
Add 5 g (2-aminoethyl)-3-aminopropyltrimethoxysilane
Add 2 mL Distilled H2O
Add 19 g Hexane After the 19 g of hexane is added, mix the Batch 1 for several minutes (solution is hot).

Batch 2: Combine and blend after every addition:
30.0 g clean FDE (from the rinsing step above)
Add 75 g Hexane, plus an additional ~20 g
Add 5 g AHS (aminohexylaminopropyltrimethoxysilane)
Add 2 mL H2O After the 2 mL of H2O is added, blend Batch 2 for 5 minutes (solution is hot). Heat both batches at 170 F to remove hexane.

iii) Formulation C
Combine in a container and in order:
10 g FDE clean
66 g Hexane
1 g Acrylic silane methyacryloxypropyl-trimethoxysilane
14 g Hexane
1 mL H2O Upon blending the above mixture, it was observed that initially there were continuous plumes of hexane vapor and smell of a gas.

iv) Formulation D
Combined in a container:
2.8 g FDE (cleaned)
18 g Hexane
0.6 g AHAPTMS (aminohexylaminopropyltri-methoxysilane)
0.5 g H2O Stir the mixture by hand using a stirring instrument and decant the particles. Recovered 4.8 g wet particles.

v) Formulation E
Combined in a container:
3.0 g FDE
19 g Hexane
0.6 g MAPTMS (methacryloxypropyltrimethoxysilane)

Stir the mixture by hand using a stirring instrument and decant the particles. Recovered 3.8 g wet particles. When dried, 2.7 g grams or particles was recovered.

Treating Multifunctional Particles with Ninhydrin:

To validate the chemical reactivity of the multifunctional particles, the particles were treated with an aminoalkylsilane, which is generally used as a silane coupling agent. These nanoparticles were treated with ninhydrin, a chemical indicator which shows the presence of amino ($-NH_2$) groups by turning the surface blue or purple. Treating silica particles functionalized with only the hydrophobic silanes resulted in yellow color, which is the same color as the ninhydrin. Fluorocarbon-functionalized diatomaceous earth was rinsed in hexane and functionalized with an aminoalkylsilane, and then these particles were rinsed to remove non-bound amino groups. Immersion of the nanoparticles in a 0.5 wt % ninhydrin in isopropanol solution resulted in turning the solution and nanoparticles deep purple. The purple color has remained through many rinse/centrifuge/decant cycles with both hexane and isopropanol as the rinsing agent and through ultrasonication of particles to try and remove weakly bonded purple pigment groups from the particle surface. The nanoparticles were dried and found to be still superhydrophobic with the purple color change permanent, indicating that the nanoparticles can also have their color changed through chemical treatment. Mixing ninhydrin in FDE results in no change to the material color. It has been found that FADE will change to lighter shades of purple depending on the age over the course of a week, suggesting that the amino groups react with air or humidity.

A) Procedure for Ninhydrin Treatment:

In a 2.0 mL microcentrifuge tube, put approximately 0.2 g of multifunctional particle powder into the tube (fill up to the 0.5 mL line). Fill the rest of the tube with ninhydrin solution. Close lid and shake tube to blend particles into the ninhydrin solution. Amine functional particles will show color change in the span of several seconds through minutes to hours, depending on the concentration of amine silanes on the particles.

B) Ninhydrin Treatment and Multifunctional Particle Preparation

Combine in a container:
50 g FDE (cleaned)
90 g Hexane
8.2 g AHS (aminohexylaminopropyltrimethoxysilane)
3 mL H2O Distilled
Plus additional 100 mL Hexane to get particles distributed into liquid.

Blend the FDE particles in the mixture for several minutes, and then filter the mixture with coffee filters. Heat the filtered mixture at 230° F. to speed up hexane removal. Rinse the filtered multifunctional particles according to the rinse cycle procedure below two times prior to ninhydrin testing to help eliminate unbounded amino silanes from the particles. After 24 hours, the multifunctional particles turned blue.

Rinse Cycle Procedure:

Place a small aliquot of particles in 2.0 mL microcentrifuge tube. Fill the tube with fresh hexane.

Shake the tube to form a uniform solution. Centrifuge the solution at 3300 RPM for 60 seconds.

Decant the solution and then refill the tube with fresh hexane and repeat. After another decant, fill the tube with the ninhydrin solution. Particles changed color after reacting with ninhydrin.

After five days, the multifunctional particle powder was again treated with ninhydrin, but the powder turned a light purple and did not turn as purple as the previously tested multifunctional particle powder despite being previously rinsed. To establish that the difference in the shades of purple was not linked to hexane presence, the multifunctional particle powder was tested against a control. The control included unfunctionalized DE powder that was rinsed 2 times with purified hexane and tested with ninhydrin. No difference was seen between a hexane-rinsed diatomaceous earth and the control DE. It was concluded that ($-NH2$) groups decay over time or react with air.

Preparation of Compositions that Include Silica Particles and Polypropylene:

i) Control
Combine and blend:
4.1 g PP (polypropylene)
29 g Xylol ii) Single Functional Particle Composition
Combine and blend:
5.0 g PP
1.2 g Phenyl-functionalized DE
39 g Xylol Heat the control and the composition mixtures to 140° C., blend the heated mixture, and then pour the heated mixture into a mold. The polymer substrate was removed from the mold and found to lack superhydrophobicity.

iii) Methacrylate Silane Formulation:
15 g DE at room temperature
133 g Hexane
1.5 g Methacrylate silane
Plus <1 g H2O iv) Octadecyltrichlorosilane Silane Formulation:
Rolled 3.0 g of PP in 1.0 g DE functionalized with octadecyltrichlorosilane (ODCx). PP granules were covered with a thick layer of ODCx. The coated granules were heated to 150° C. There was too much ODCx for the entire granule collection to melt together, but some of the granule collection conglomerated. This conglomeration was observed to be superhydrophobic and durable with moderate finger rubbing.

v) Preparation of a Silica Particle/Polymer Construction

To prepare the construction, the interior surface of a mold is pre-dusted with a layer of appropriate particles and other necessary catalysts/additives and the polymer melt is injected so that the powder becomes stabilized on the surface of the resulting polymer part. For example, place a layer of functionalized diatomaceous earth onto a diamond like carbon (DLC) coated aluminum. Heat polymer (e.g., PP) and place the polymer into a mold, then cover with another layer of functionalized diatomaceous earth. Use another diamond-coated aluminum to press the coated PP mold into a sandwich construction.

Variation 1 (Paste Method):

Blend the functionalized diatomaceous earth into a solvent, making a paste, and then blend the paste into a hot polymer. In one experiment, 0.3 g methacrylic functionalized diatomaceous earth was blended with 0.7 g mineral spirits to make a paste, and then the past was blended with approximately 12 g of heated PP.

Variation 2 (Blend Method):

Blend a multifunctional diatomaceous earth powder into a hot polymer melt. In these experiments, the polymer was placed into a mold and melted at 400 F, and then removed from heat. Multifunctional diatomaceous earth was placed onto the surface of the polymer melt and manually blended into the PP at roughly 3-10 wt %. An excess amount of particles was used, and unbounded particles were recovered for future use. The polymer blend was then placed back into the oven to heat at 400 F for another 15-20 minutes.

Variation 3 (Press Method):

Press a multifunctional diatomaceous earth into the surface of a hot polymer melt. In these experiments, the polymer was placed into a mold and melted at 400 F, and then removed from heat. The surface press method is similar to the blend method, except the particles were brushed onto the surface at less than 1 wt % and lightly pressed for several seconds. An excess amount of particles was used, and unbounded particles were recovered for future use. The polymer blend was then placed back into the oven to heat at 400 F for another 15-20 minutes.

vi) Test Observations for the Silica Particle/Polymer Construction a) Fluorinated Silica Particles (single functionality): The construction was found to be not superhydrophobic because particles became concealed by the polymer during cure in the press and blend methods described hereinabove. Some amount of superhydrophobicity was observed with the press method, but these particles were not bound and simply washed away with water or were blown off with air.

b) Non-functionalized Silica Particles: The construction was observed to be not superhydrophbic as particles became embedded into the material.

c) Amine-functionalized Silica Particles: The particles in this construction were successful in maintaining surface coverage in the blend and press methods. These samples appeared to have the most durability to finger rubbing.

d) Vinyl-functionalized Silica Particles: The particles in this construction were successful in maintaining surface coverage in the blend and press methods. These samples appeared to have the good durability to finger rubbing.

e) Azide-functionalized Silica Particles: The particles in this construction had some success, although samples had some areas of hydrophiliticity that could have been due to manufacturing technique.

f) Methacryloxy-, Octadecyl-, and Phenyl-functionalized Silica Particles: These polymer blends were not superhydrophobic.

Although the constructions and compositions were prepared using PP, it will be understood that any number of polymers can be used. It will be further understood, that the polymer construction can also be prepared by processing the multifunctional silica particles as a polymer blend additive such as in co-extrusion.

Preparation of Compositions that Include Silica Particles and Epoxies

Diatomaceous earth particles have a surface area of about 30 m$^2$/g. The silanes used both have a coverage rating of about 300 m$^2$/g. Thus, the theoretical particle surface area is 150 m$^2$ and the silanes occupy 90 m$^2$, for a total surface coverage of 60%. This is well in excess of what has been shown to produce superhydrophobic DE, which is about 17% theoretical area when using chlorosilanes. By adding X amount of aminosilane first, the aminosilanes will cover a certain percent of the particle first, and then the 0.5 g of fluorosilane will completely saturate the rest of the particle, then be rinsed out of the particles in post-production. For example, putting 0.1 grams of silane on 5.0 g DE would theoretically cover 20% of the particles, leaving 80% of the surface for the fluorosilane. See Table 1 below for further details.

TABLE 1

| Amount of Aminosilane X (g) | Amine surface coverage | Fluorine surface coverage |
| --- | --- | --- |
| 0 | 0 | 100% |
| 0.1 | 20% | 80% |
| 0.2 | 40% | 60% |
| 0.3 | 60% | 40% |
| 0.4 | 80% | 20% |
| 0.5 | 100% | 0 |

Diatomaceous earth particles were functionalized according to the formulation provided below, having both fluorinated and alkylamine silanes.

5.0 g DE
0.2 g FAOS (1H,1H,2H,2H-perfluorooctyltrimethoxysilane) (hydrophobic silane)
0.1 g AHAPS (6-aminohexyl-3-aminopropyltrimethoxysilane) (coupling agent)
7 g Hexane
0.04 g Water The resulting multifunctional particles constituted the FADE (fluorocarbon/amino multifunctional diatomaceous earth) particles. An additional lot of diatomaceous earth was functionalized with just fluorinated silanes. This constituted the FDE particles (a control group). These particles were used to create two powder coatings on aluminum coupons as follows:
i) Base coat: Epoxy Powder
ii) Top coat: 80 wt % Epoxy Powder, 20% Diatomaceous earth powder One coating incorporated FADE particles, the other used FDE particles. These powder coatings were deposited and cured according to manufacturer instructions. First, the aluminum coupon was coated with the epoxy powder until the surface was saturated. The coupon was then coated with the epoxy/diatomaceous earth powder blend until the surface was saturated. The coupons were cured at 400° F. for 10 minutes, as per the powder instructions.

Figure 3:
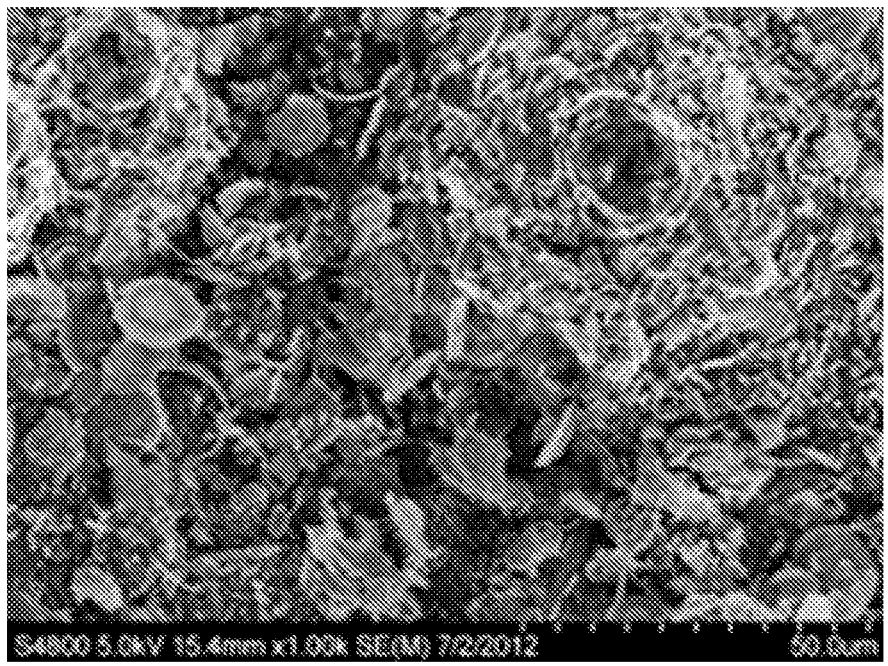
FIG. 3 illustrates a scanned image of a Scanning Electron Microscopy (SEM) image of an epoxy coating with multifunctional particles in accordance with various embodiments.
Figure 4:
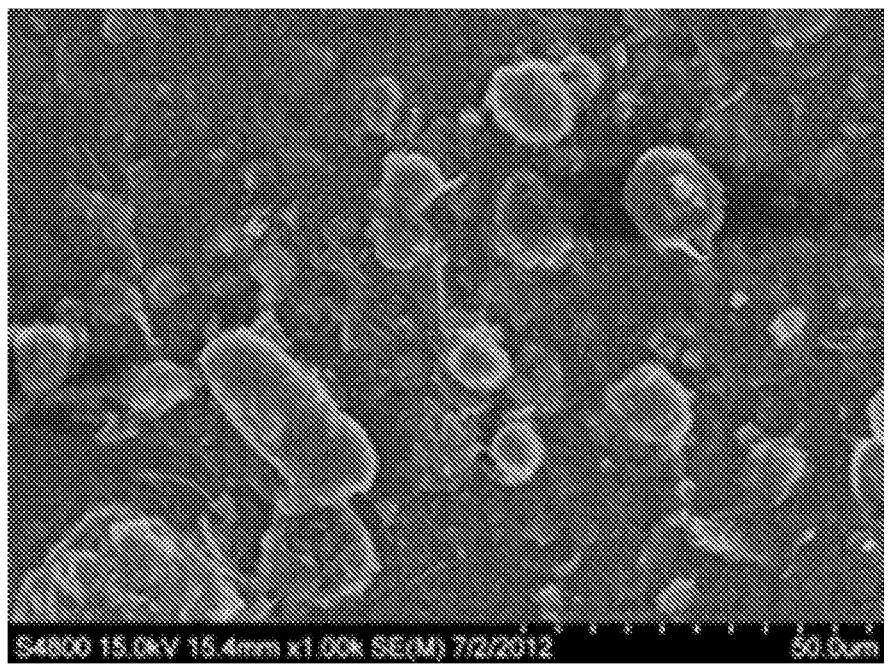
FIG. 4 illustrates a scanned image of a Scanning Electron Microscopy (SEM) image of an epoxy coating with fluorinated diatomaceous earth particles in accordance with various embodiments.

After cooling, both coatings were mechanically dusted by hand and blown with 30 psi of compressed air. The epoxy coating formulated with FADE particles was superhydrophobic and the particles were not removed by the compressed air. The top layer of the FDE coupon, on the other hand, did not adhere to the coupon surface and was blown off, resulting in a non-superhydrophobic coating. Afterwards, the coupons were analyzed with SEM as shown in FIGS. 3 and 4. FIG. 3 illustrates an image of the epoxy coating with the FADE particles and FIG. 4 illustrates an image of the epoxy coating with the FDE particles.

The presence of amino silanes on the FADE allowed chemical bonding of the diatomaceous earth to the epoxy chemicals, allowing chemical bonding of the particles to the surface as well as allowing epoxy polymers to form to the particle as opposed to concealing the particle. These FADE-Epoxy coatings are superhydrophobic and show increased levels of mechanical durability over other non-multifunctionalized coatings as determined by abrasion resistance to an ungloved finger. This FADE-Epoxy coating showed to be resistant to high water pressure, which was unable to penetrate the coating and wet at all. Other coatings were found to be susceptible to the same high water pressure, creating areas where the superhydrophobic coating was wetted.

In the above FADE formulation, it is thought that the overall particle behavior is dependent on the ratio of hydrophobic silane to (hydrophilic) silane coupling agent. That is, the particle has a majority of hydrophobic surface area in order to produce a superhydrophobic nanoparticle. The mass of hexane is based on larger scale production levels of hexane to diatomaceous earth ratios and was not found to be practical for this small scale testing.

Particles were coated as above, but the FADE were produced with varying amounts of amino silane. These particles have a surface area of about 30 m²/g, and the silanes used in this study have a surface coverage rating of about 300 m2/g. Thus, 1.0 g of diatomaceous earth could be 100% covered by 0.1 g of total silane. However, the true amount of surface coverage is limited by steric hindrance and reaction time.

In order to facilitate the bonding of aminosilanes to the particle, the aminosilanes and water were blended into the solution first for several minutes before addition of the fluorosilanes. Afterwards, 0.5 g of fluorosilane was blended into the solution in order to maximize hydrophobic character of the rest of the particle. The amount of hexane added was largely irrelevant as long as it dissolved the particles. All samples had a small amount of water added to the solution (<0.1 g) to catalyze the reaction (see Table 2 below).

TABLE 2

| Control | AM01 | AM02 | AM04 | AM05 | AM10 |
|---|---|---|---|---|---|
| 5.0 g DE | 5.0 g DE | 5.0 g DE | 5.0 g DE | 5.0 g DE | 5.0 g DE |
| 0.0 g APS | 0.1 g APS | 0.2 g APS | 0.4 g APS | 0.5 g APS | 1.0 g APS |
| 0.5 g FAOS | 0.5 g FAOS | 0.5 g FAOS | 0.5 g FAOS | 0.5 g FAOS | 0.5 g FAOS |
| 10 g Hex. | 17 g Hex. | 24 g Hex. | 17 g Hex. | 20 g Hex. | 29 g Hex. |

The particles were isolated and dried, then blended into epoxy powder at an 80 weight % epoxy powder to 20 weight % FADE ratio. Coatings were made similar as discussed hereinabove with a pure bottom coat and an 80/20 top coat sprayed onto drywall samples.

The control sample, with diatomaceous earth functionalized solely with the FAOS and without the aminosilane, was not superhydrophobic and had no gloss. Visually, the samples with amine had increasing reflectance and sheen with increasing amine content, similar to a control epoxy powder coat that had no diatomaceous earth. The contact angle of superhydrophobic samples appeared to decrease with additional amine groups to the particle. The samples also had increasing particle retention and durability with increasing amine content. The AM10 sample had high gloss, but was not superhydrophobic, indicating amine levels had overwhelmed the superhydrophobic properties of the particles.

Water contact angles were measured and are listed in Table 3 below. Due to the angle of the samples, contact angles were measured and an average was used to characterize the surface.

TABLE 3

| Sample | WCA Left | WCA Right | Average WCA |
|---|---|---|---|
| Ctrl 00 | 142.177 | 118.072 | 130.1245 |
| AM01 | 155.014 | 157.166 | 156.09 |
| AM02 | 152.583 | 152.033 | 152.308 |
| AM04 | 151.849 | 151.821 | 151.835 |
| AM05 | 150.980 | 150.803 | 150.892 |
| AM10 | 117.848 | 116.259 | 117.0535 |

Figure 6:
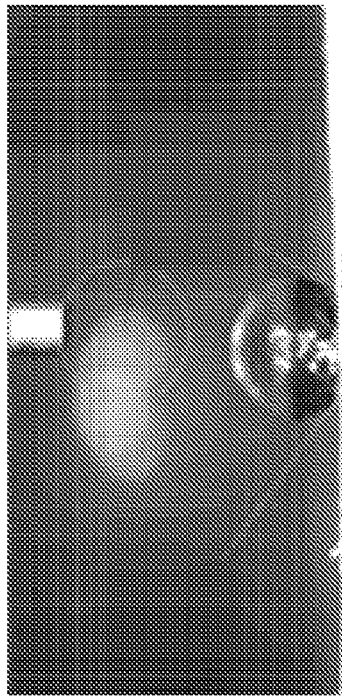
FIG. 6 illustrates an image of a water drop contact angle for characterizing the hydrophobicity of a surface in accordance with various embodiments.
Figure 8:
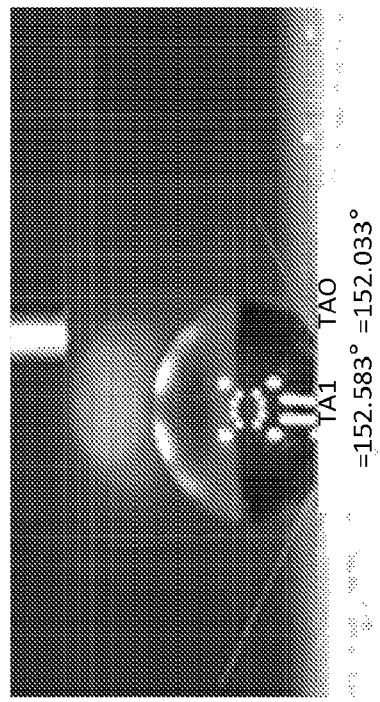
FIG. 8 illustrates an image of a water drop contact angle for characterizing the hydrophobicity of a surface in accordance with various embodiments.
Figure 10:
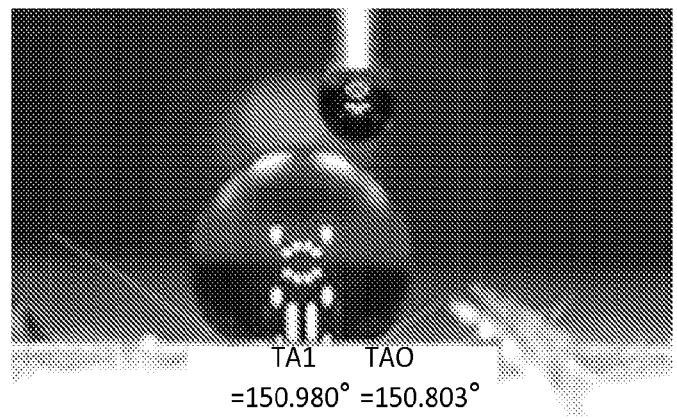
FIG. 10 illustrates an image of a water drop contact angle for characterizing the hydrophobicity of a surface in accordance with various embodiments.
Figure 11:
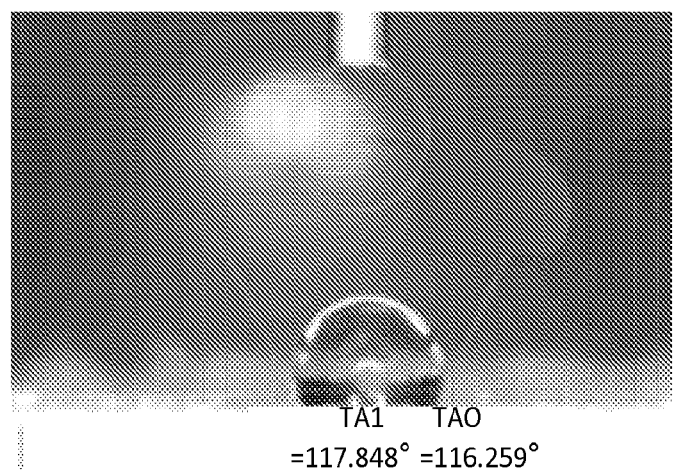
FIG. 11 illustrates an image of a water drop contact angle for characterizing the hydrophobicity of a surface in accordance with various embodiments.

FIGS. 6-11 illustrate images of a water drop contact angle for characterizing the hydrophobicity of the epoxy coated surfaces. FIG. 6 corresponds to the Ctrl 00 sample, FIG. 7 corresponds to the AM01 sample, FIG. 8 corresponds to the AM02 sample, FIG. 9 corresponds to the AM04 sample, FIG. 10 corresponds to the AMOS sample, and FIG. 11 corresponds to the AM10 sample.

The mechanism of this transition between matte superhydrophobicity and glossy hydrophobicity is linked to the fact that particles with increased amine content are able to have a higher concentration of covalent bonds to the polymer. The fluorinated particles will naturally not link to the epoxy functional groups, resulting in a substrate that has porous surface defects that interfere with optical reflectance. Adding aminosilane allows the epoxy to bond directly to the particle, and increasing the silane content results in more bonding sites resulting in a uniform coating with increased reflectance properties—and higher glossiness. Higher covalent bonding content results in increased mechanical durability, as the particles have more chemical links to the polymer overall.

In some embodiments, the silane coupling agent used for chemical bonding matches the targeted polymer to produce a coating with increased durability. For example, FADE AM04 particles (1.0 g) were blended into a PVC cement (2.0 g) and MEK (10 g) solution, a typical superhydrophobic coating formulation that has low durability. The resulting coating using the FADE was superhydrophobic but had very low durability, as particles would easily be brushed off of the surface. To identify if the amine sites were reacted, ninhydrin indicator solution was applied to this PVC coating as well as to the previous AM04 sample. Ninhydrin will turn purple in the presence of —NH and —NH2 groups.

Figure 5:
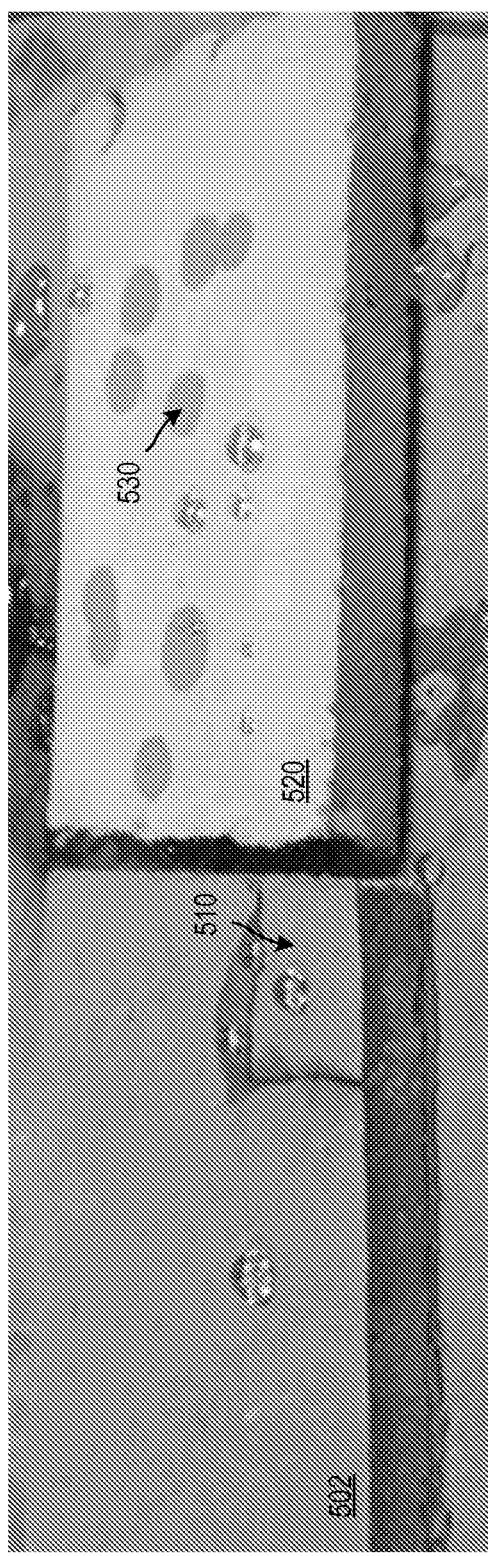
FIG. 5 illustrates and image of a sample of wallboard having a superhydrophobic epoxy coating applied thereto and a sample of wallboard having a polyvinyl chloride coating applied thereto in accordance with various embodiments.
Figure 7:
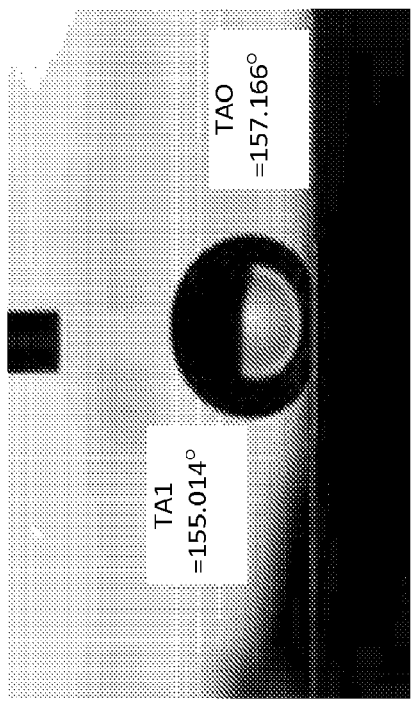
FIG. 7 illustrates an image of a water drop contact angle for characterizing the hydrophobicity of a surface in accordance with various embodiments.
Figure 9:
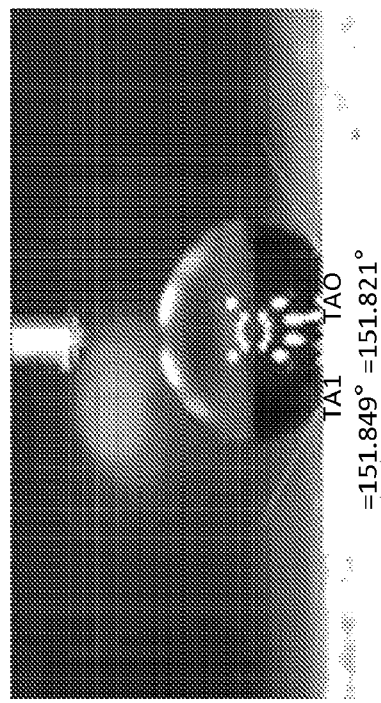
FIG. 9 illustrates an image of a water drop contact angle for characterizing the hydrophobicity of a surface in accordance with various embodiments.

The ninhydrin solution was absorbed by both coatings. As shown in FIG. 5, the ninhydrin did not produce a purple reaction with the amino particles in the epoxy coating in the ninhydrin treated area 510 of the AM04 coated sample 502, likely due to these particles having fully reacted with the epoxy resin. The black streaks shown in FIG. 5 at the ninhydrin treated area 510 resulted from isopropyl alcohol in the ninhydrin solution streaking the black Sharpie marker used to designated the area 510. The ninhydrin did produce a purple reaction with the functionalized diatomaceous earth (AM04) in the PVC cement coated drywall sample 520 as evidenced by the purples spots 530 (see FIG. 5). In this case, the PVC cement apparently did not react to these particular aminosilanes, resulting in a coating that has diatomaceous earth particles that are bound mechanically only in a low durability coating. It is also evident that the chemical reaction did not influence the superhydrophobicity of the coating.

Existing superhydrophobic diatomaceous earth technology does not use multifunctionalized particles. This limits the applicable polymers for these particles. For example, the base fluorinated particles cannot produce a superhydrophobic coating when used with epoxy powder coat materials. When the diatomaceous earth has both amine functional silanes and fluorinated silanes, it is possible to produce a superhydrophobic epoxy powder coat material.

The above test results further show that altering the amount of amine silane on the silica particle will influence the characteristics of the resulting coating. Increasing amine content will increase durability, glossiness, and particle retention while remaining superhydrophobic. Overloading the particle with aminosilane results in a coating that resembles the base epoxy coating, in that it is very glossy yet is not superhydrophobic.

Preparation of Compositions that include Silica Particles and Acrylonitrile Butadiene Styrene:
Combine and blend:
25.7 g MEK
1.8 g ABS (acrylonitrile butadiene styrene) Black
1.9 g FADE Blend the above mixture with a magnetic stir bar. Hand dip a glass slide into the mixture and bake the coated glass slide for several minutes at 200° F. In the thin areas of the coating, the coating surface was not superhydrophobic, but the coating was superhydrophobic in thicker areas. Increase thickness by immersing the glass slide for about 20 seconds and then bake the coated glass slide for 2 minutes at 200° F. The coating was observed to be durable as only a small amount of powder could be rubbed off of the glass surface. The surface was also superhydrophobic after being rubbed with a gloved hand to visibly remove powder from the surface. A high pressure jet of water eventually applied to the coated glass surface eventually wetted the surface.

Modification of the Above Formula:
Add 2 g ABS to remaining 26 g of solution, and repeat the above process. A thick and opaque coating that was applied to the glass was found to be durable and superhydrophobic with no visible powder removed upon wiping. High pressure water wets surface and water rubbed on surface wets as well, however, drying the surface restores the durable and superhydrophobic properties. Glass sample holds up to rubbing with an ungloved finger and maintains near superhydrophobic roll off of 5-10 degrees.

Figure 12:
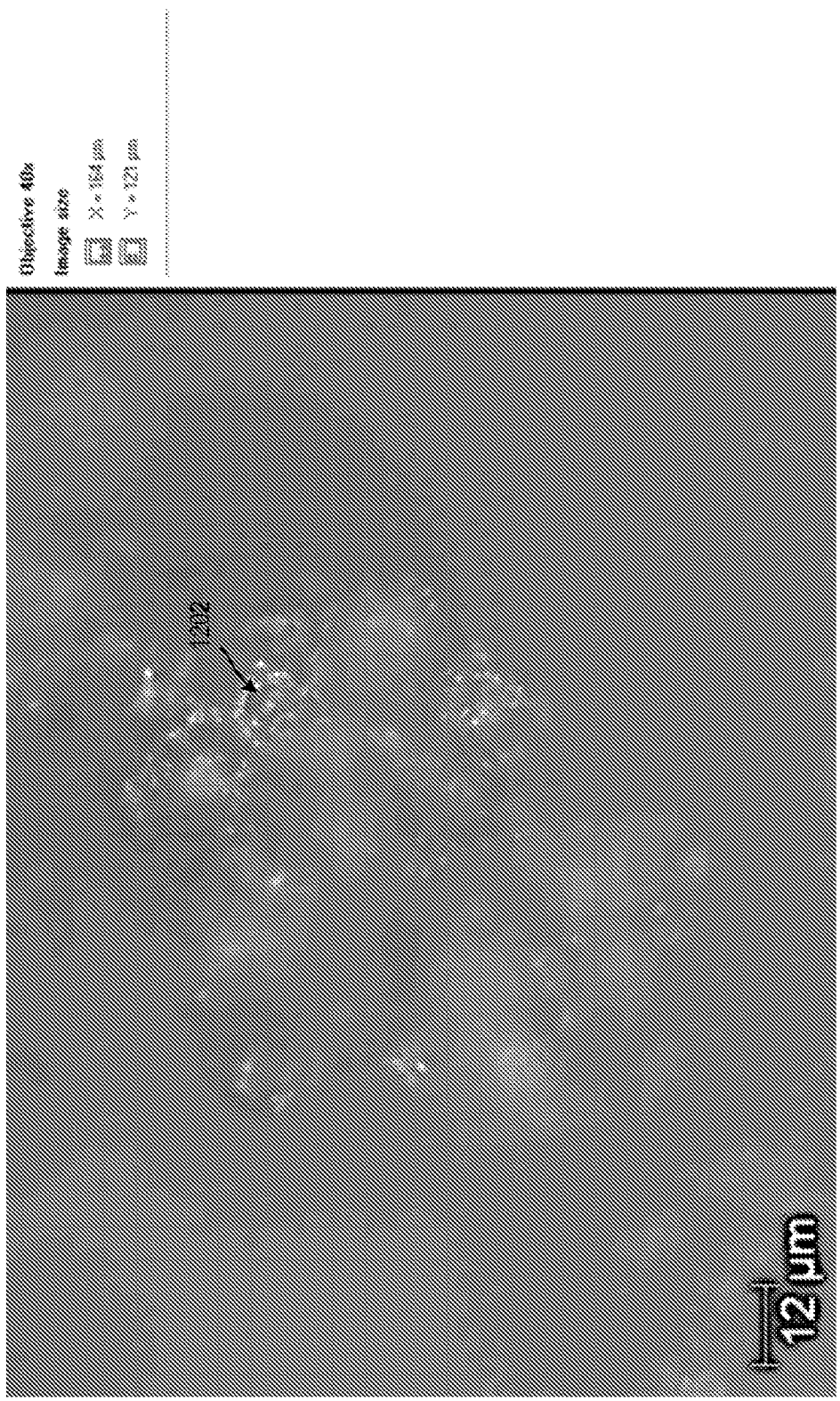
FIG. 12 illustrates a SEM image of asphalt with diatomaceous earth particles in accordance with various embodiments.
Figure 13:
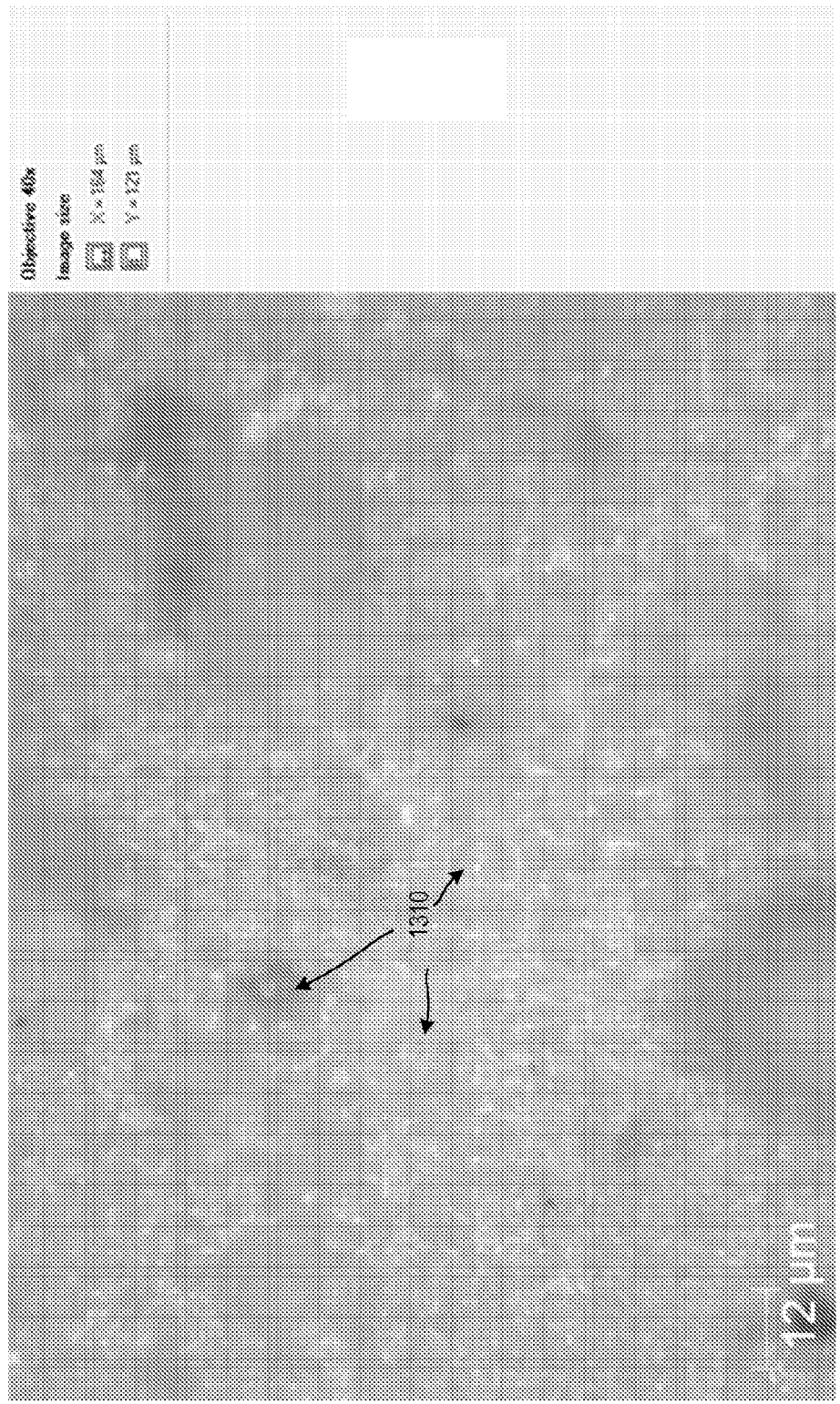
FIG. 13 illustrates a SEM image of an epoxy coating with diatomaceous earth particles in accordance with various embodiments.
Figure 14:
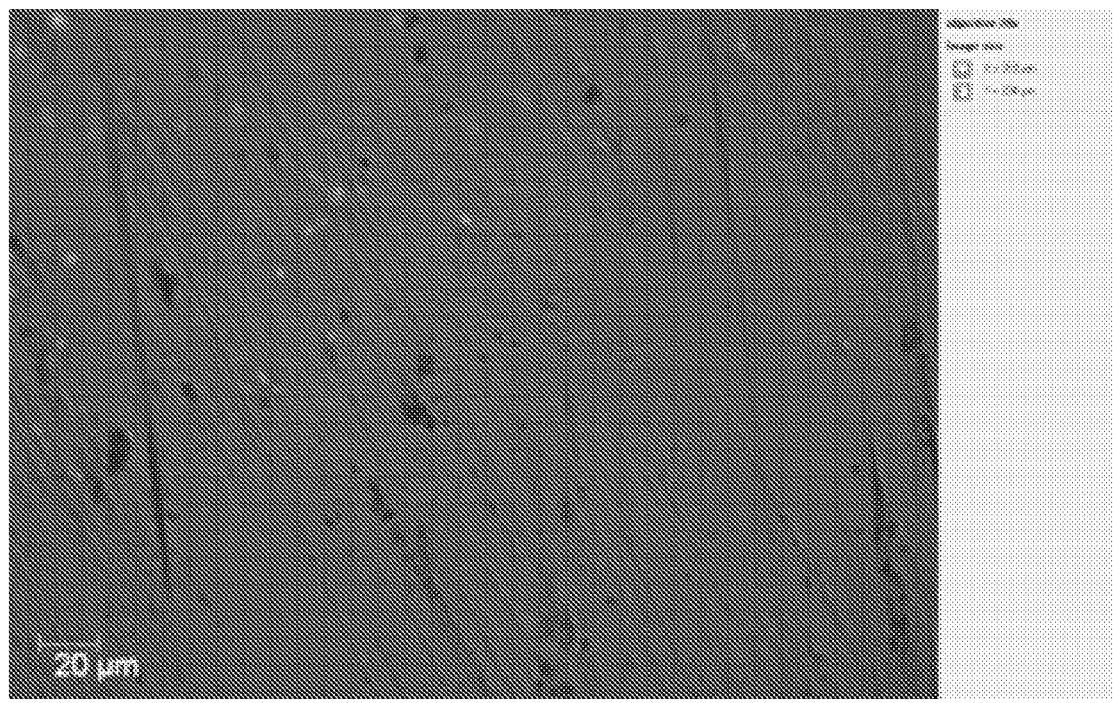
FIG. 14 illustrates a SEM image of unmodified asphalt in accordance with various embodiments.

Preparations of Asphalt Compositions that Include Silica Particles:

A series of experiments were performed to modify low viscosity asphalt paint, using either an organic solvent-based asphalt of water-based asphalt. FIG. 12 illustrates a SEM image of asphalt coating with un-functionalized DE. The circular objects, for example the circular object 1202, represent the particles of DE. As shown in the illustrated embodiment, the coating surface is very porous with many structure having high aspect ratios. FIG. 13 shows a SEM image of an epoxy-based polymer coating with multifunctional DE having a continuous surface, which is flat, non-porous, and that has good abrasive durability. Circular objects 1310 of FIG. 13 are DE particles. FIG. 14 shows an SEM image of un-modified asphalt.

Method:

Diatomaceous earth functionalized with various fluorinated silanes and/or silane coupling agents (e.g., amine, methacryloxy, OTS) are dispersed in a toluene solution and blended into the asphalt paint. The resulting solution is sprayed with a compressed air system onto surfaces for evaluation. When diatomaceous earth is blended directly into asphalt paint, it acts as a thixotropic agent and the resulting spray coating is generally not superhydrophobic. The coating can become superhydrophobic when the solution is diluted with toluene after particles have been added, but this is inconsistent. Most consistent results are blending in a toluene-DE paste into the asphalt.

1. Dilute 2.5 g multifunctional diatomaceous earth particles in 5.0 g toluene
2. Blend the particles and toluene mixture into 2.5 g solvent-based asphalt in air condition.
  a. Add catalysts or additives while blending
  b. If necessary, heat solution within a distillation column
3. Spray the mixture onto the surface of a substrate in several thin coats. Avoid 'puddling' the solution or otherwise creating wet gels in the coating. Final coating thickness is about 2 mils after air drying.
4. Resulting coating is brown and superhydrophobic.
5. Different silanes, catalysts, and additives have shown to have influence on final coating properties, such as ability to wet over time, abrasive durability, and water pressure resistance.
6. Particle Functionalization: Particles were loaded at a 1:10 weight ratio of total silane to bulk powder silica particles in hexane with a small amount of water added to the solution. Silanes were generally assumed to have at least 300 m2/g of coverage, and the DE particles generally have 30 m2/g of surface area. Particles with two silanes were loaded at 60/40 or 70/30 weight percent ratios of hydrophobic silane (fluorocarbon) to silane coupling agent.

Test Results a) Methacryloxy-functional silane coupling agents for multifunctional particles: these asphalt coatings had the best overall properties when used with no other additives. The coatings were superhydrophobic and had high durability and high water pressure resistance. Benzoyl peroxide was used as a catalyst to increase bonding of methacryloxy particles to produce more robust coating samples with the same magnitude of durability.

b) Octadecyl and phenyl functional silanes for multifunctional particles: resulted in coating with lower abrasive durability when compared to the asphalt coating with methacryloxy silanes. Octoadecyl based coating had high durability and water pressure resistance. Phenyl based coating had mediocre durability.

c) Amine-functional silane coupling agents for multifunctional particles: adding ABS (acrylonitrile butadiene styrene) polymer to the asphalt and using amine silane coupling agents to functionalize the DE generated better test results than methacryloxy asphalts. Amine based coatings had low to mediocre durability with no additives, but the coating had the highest durability of all additives once combined with ABS.

d) Puddling the asphalt spray results in a black or otherwise very dark coating that is smooth but not superhydrophobic.

e) Plain diatomaceous earth: asphalt becomes superhydrophobic, but has low durability, low water pressure resistance, and wets over time.

f) Fluorocarbon singly functional DE: The asphalt coating is superhydrophobic, but water droplets wet within seconds of sustained contact. Low durability and water pressure resistance. Further, fluorinated powder has decreased miscibility with hydrocarbon solvents. Particles can be more easily blended with toluene when treated with chemically active silanes as well as fluorosilanes. Still further, fluorocarbon is not necessary to produce a superhydrophobic coating.

g) Additives:

1) Acryl Butadiene Styrene—Increased durability of methacryloxy and amine asphalt blends. Made amine based coatings the most durable asphalt coating.
2) Benzoyl Peroxide—Used with methacryloxy particles.

APPLICATIONS

The multifunctional diatomaceous earth particles can be used to create a mechanically robust superhydrophobic surface when combined with polymer binders. This is due to copolymerization of the adhesive chains with monomers, resulting in particles that are mechanically and chemically bound to a given surface. For example, this superhydrophobic composition can be applied as a sealant on surfaces that are prone to water permeability and corrosion such as underground PVC pipes, wall board, underground building materials, pipe interiors, and power line protective sheaths. The composition can be applied as a biofouling prone material such as underwater pier structures. The composition can be applied to enhance water flow on surfaces such as pipe interiors, boat hulls, surf boards, other general water and snow sports products, gutters, under-deck draining structures, marine and aviation bilge areas, and consumer product bottles.

The composition can be applied to concrete, asphalt roadways/racetracks, composite decking and wooden walking surfaces to prevent the absorption of water, prevent the formation of ice, and decrease the drying time on these surfaces. The composition could be applied to Radar radomes to prevent the absorption of water and prevent the formation of ice. The composition can be applied to wood and paper products as a barrier to prevent surfaces from wetting and developing biological growths such as mold and mildew. The composition could be used in a mixture with water or oil to allow for controlled compressibility of the mixture for use in shock absorbers, pressure sensors, and hydraulic systems. The composition can be applied to heat pump condenser coils to reduce energy consumption related to coil deicing. The composition can be applied to circuit boards and other electronics to prevent electrical shorts due to wetting. The composition can be applied to fiberglass and other thermal insulating materials to prevent wetting and reduced functionality. The composition can be applied to medical and personal hygiene devices to reduce the likelihood of water transferred bacteria and germs.

The silane coupling agents can be adjusted such that the multifunctional particles can chemically bond to natural and synthetic textiles, which can be used for swim suits, solvent-resistant clothing, and chemical resistant military uniforms or other protective coating. Such textiles can be used as durable, robust, and scalable low-surface-energy textile treatments for militarily relevant, synthetic textiles that will prevent absorption and adhesion of fine aerosols and that will shed most bulk liquids.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated.

Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for producing a multifunctional particle, the method comprising:

contacting a hydrophobic silane to a surface of a silica particle comprising a diatomaceous earth particle, a fused silica particle or a rice husk ash particle to chemically bond the hydrophobic silane to at least a portion of the surface of the silica particle;

contacting a silane coupling agent to the surface of the silica particle to chemically bond the silane coupling agent to at least a portion of the surface of the silica particle;

rinsing the silica particle with a solvent after contacting at least one of the hydrophobic silane or the silane coupling agent to remove impurities and to remove any of the at least one of the hydrophobic silane or the silane coupling agent that are unattached to the silica particle; and wherein the multifunctional particle is superhydrophobic and chemically reactive.

2. The method of claim 1, wherein the hydrophobic silane and the silane coupling agent are simultaneously bonded to the surface of the silica particle.

3. The method of claim 1, wherein the hydrophobic silane bonds to the surface of the silica particle before the silane coupling agent bonds to the surface of the silica particle.

4. The method of claim 1, wherein the silane coupling agent bonds to the surface of the silica particle before the hydrophobic silane bonds to the surface of the silica particle.

5. The method of claim 1, wherein the silane coupling agent is selected from the group consisting of amino-functional hydrocarbon silanes, N-(6-aminohexyl)-3-aminopropyltrimethoxysilane, aminohexylaminoethyltrimethoxysilane, aminopropyltrimethoxysilane, aminopropyltriethoxysilane, N-(2-Aminoethyl)-3-aminopropyl-trimethoxysilane, methyacryloxypropyl-trimethoxysilane, and combinations thereof.

6. The method of claim 1, wherein the silane coupling agent comprises amine silanes, olefin silanes, anhydride silanes, epoxy silanes, halogen silanes, hydroxyl silanes, dipodal silanes, acrylate silanes, sulfur-containing silanes, isocyanate silanes, or azide silanes.

7. The method of claim 1, wherein the hydrophobic silane comprises a molecule of the structure:

$$X_y(CH_3)_{(3-y)}SiLR$$

where y is 1 to 3;

X is Cl, Br, I, H, HO, R'HN, R'2N, imidizolo, R'C(O)N(H), R'C(O)N(R''), R'O, $F_3CC(O)N(H)$, $F_3CC(O)N(CH_3)$, or $F_3S(O)_2O$, where R' is a straight or branched chain hydrocarbon of 1 to 4 carbons and R'' is methyl or ethyl;

L, a linking group, is $CH_2CH_2$, $CH_2CH_2CH_2$, $CH_2CH_2O$, $CH_2CH_2CH_2O$, $CH_2CH_2C(O)$, $CH_2CH_2CH_2C(O)$, $CH_2CH_2OCH_2$, $CH_2CH_2CH_2OCH_2$; and R is $(CF_2)_nCF_3$ or $(CF(CF_3)OCF_2)_nCF_2CF_3$, where n is 0 to 24.

8. The method of claim 1, wherein the ratio of the hydrophobic silane to the silane coupling agent chemically bonded to the surface of the silica particle is from 5:1 to 2.5:1 by weight.

9. The method of claim 1, wherein the multifunctional particle comprises a self-assembled monolayer.

* * * * *